United States Patent [19]

Stiebel

[11] 4,419,558

[45] Dec. 6, 1983

[54] APPARATUS AND METHOD FOR MONITORING AND CONTROLLING RESISTANCE SPOT WELDING

[75] Inventor: Ariel Stiebel, Bloomfield Hills, Mich.

[73] Assignee: Wagen of America, Inc., Warren, Mich.

[21] Appl. No.: 323,956

[22] Filed: Nov. 23, 1981

[51] Int. Cl.$^3$ ............................................. B23K 11/02
[52] U.S. Cl. ................................ 219/109; 219/86.51; 219/110; 219/117.1
[58] Field of Search ...................... 219/110, 109, 86.51, 219/117.1

[56] References Cited

U.S. PATENT DOCUMENTS

| | | | |
|---|---|---|---|
| 2,306,593 | 12/1942 | Collom | 219/110 |
| 2,415,082 | 2/1947 | Burr | 219/86.15 |
| 3,404,252 | 10/1968 | Michael | 219/110 |
| 3,514,569 | 5/1970 | Pfaelzer et al. | 219/110 |
| 3,553,420 | 1/1971 | Shearer, Jr. | 219/110 |
| 3,727,822 | 4/1973 | Umbaugh | 219/110 |

FOREIGN PATENT DOCUMENTS

| | | | |
|---|---|---|---|
| 71169 | 10/1959 | France | 219/109 |
| 460139 | 3/1975 | U.S.S.R. | 219/110 |

Primary Examiner—C. C. Shaw
Attorney, Agent, or Firm—Brumbaugh, Graves, Donohue & Raymond

[57] ABSTRACT

The quality of an electrical resistance spot weld is determined by monitoring the squeezing force applied through the electrodes to the workpieces by a force-transmitting device that exerts a squeezing force that varies when indentation of the workpieces occurs.

13 Claims, 3 Drawing Figures

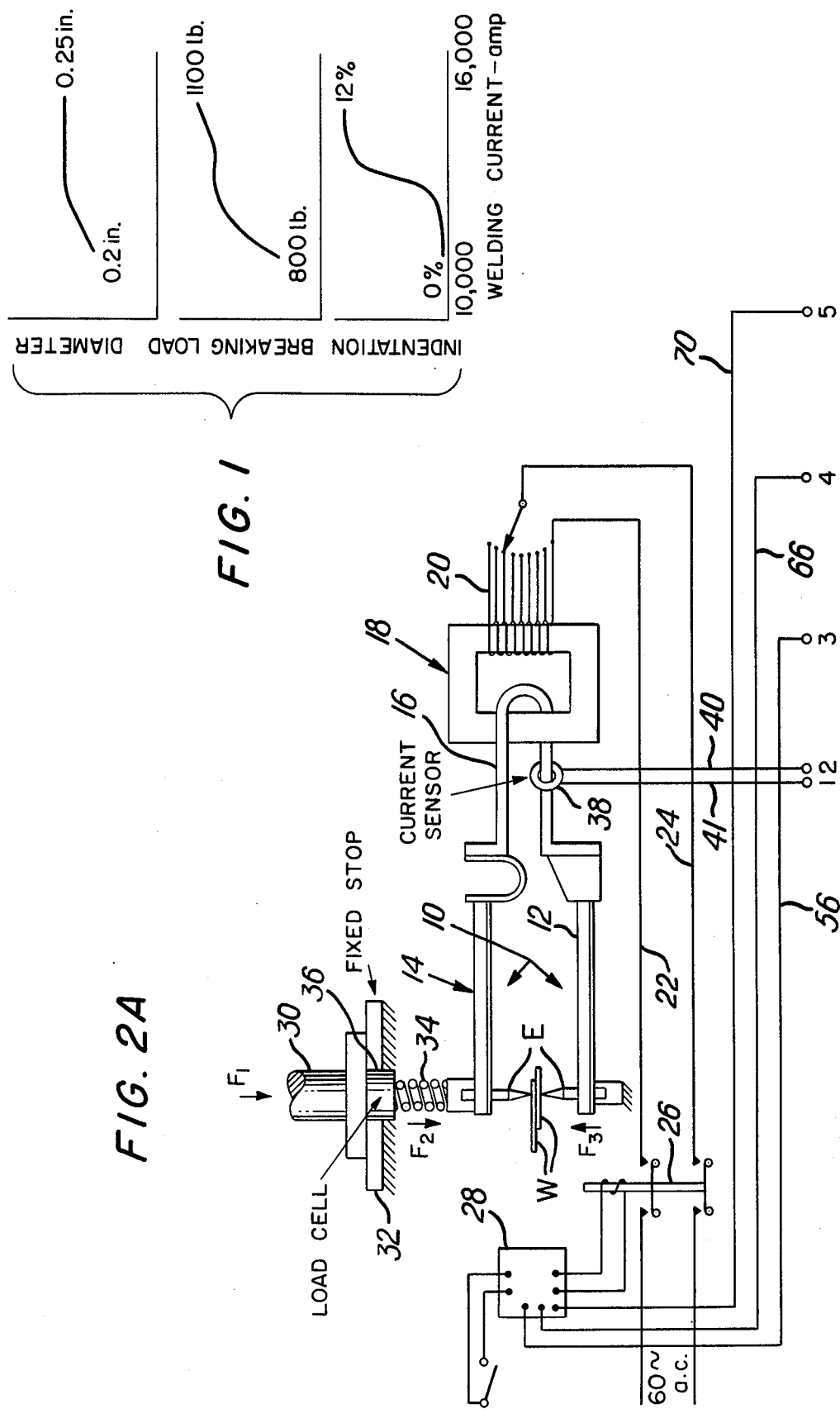

APPARATUS AND METHOD FOR MONITORING AND CONTROLLING RESISTANCE SPOT WELDING

BACKGROUND OF THE INVENTION

Resistance spot welding is a process by which faying surfaces are joined in one or more spots by the heat generated by the resistance to the flow of electric current through workpieces that are held together under force by electrodes. The contacting surfaces in the region of current concentration are heated by a short-time pulse of low-voltage, high-amperage current to form a fused nugget of weld metal. When the flow of current ceases, the electrode force is maintained while the weld rapidly cools and solidifies. The electrodes are retracted after each weld, which usually is completed in a fraction of a second.

Resistance-welding applications have grown tremendously since 1933, when the first all-steel welded automobiles were introduced. The popularity of resistance spot welding is due to the fact that this method produces welds rapidly and lends itself to automation and inclusion in high-volume, rapid production assembly lines with other fabricating operations. These advantages are offset by a serious deficiency in spot-welding, namely, the inability to control the process satisfactorily in order to produce consistently good welds. The reason for this deficiency in good control is that there are many variables which must be controlled or which vary from weld to weld, such as voltage, current, pressure, heat loss, shunting, electrode wear, and thickness and composition of the workpiece material. Some of these variables are difficult or practically impossible to control.

Throughout the years attempts have been made to automatically control resistance spot welding processes by regulating the electrical energy and, thus, the resulting heat. Current sensors have been used to provide feedback in order to maintain a constant welding current. Voltage regulators have been incorporated to compensate for line voltage variations or impedance changes. However, all these feedback systems are based on controlling process conditions according to set reference levels that, at best, have been determined empirically. There is no feedback from the actual weld process itself which could be used to control the variables in order to produce a good weld.

The vast majority of spot-welding machines are governed by timers which control four basic steps:
 1. close electrodes and apply force (squeeze time);
 2. initiate and maintain current (weld time);
 3. turn off welding current and maintain electrode force until weld nugget solidifies (hold time);
 4. open electrodes (off time).

The times required by these steps are empirically adjusted for optimum performance and remain fixed throughout subsequent spot-welding operations. It is generally assumed that the weld time is sufficiently long to bring the metal into the molten state. This is not always the case. With increasing wear of the electrodes the time needed to bring about the molten state increases and may at times be longer than the pre-set "weld time." The indentation in this case does not reach the required percentage, and a poor weld will be the result.

The present invention, as set forth hereinafter, is based on the fact that there is, indeed, one necessary condition for producing a weld—the metal must reach a molten state. If the metals to be welded do not reach the temperature required to become molten, an insufficient weld or no weld at all will result. The detection of the molten phase, which is dependent on the welding process and not on fixed parameters, is used in this invention to control the welding variables. It has been shown through measurements that as soon as the molten state is reached, the electrodes, which are being forced against the workpiece, begin to move into the metal and towards each other. This electrode movement (indentation), although generally only a few percent of the sheet metal thickness, is thus an indication of the molten phase.

The graphs in FIG. 1 of the accompanying drawings are reproduced from *RWMA Resistance Welding Manual*, 3rd Ed., Vol. 1, p. 122. They show the relationship between electrode indentation, breaking load (tensile-shear) of the welded joint and the diameter of the nugget for welds made at various currents. According to that reference the welds were made in annealed low carbon steel, 0.029 in. thick, using a type A (pointed) electrode with a ¼ in.-diameter tip, an electrode pressure of 15,000 psi (a force of about 735 lbs.) and a weld time of 6 cycles. The graphs show that at the optimum current value (13,500 amp.) the diameter of the nugget was nearly the same as the diameter of the electrode tip (¼ in.). Increasing the current above 13,500 amp did not significantly increase the nugget diameter, but caused a marked increase in electrode indentation. Tensile-shear breaking load increased rapidly until the optimum current was reached, but decreased slightly when the current was increased to slightly above 14,000 amp. Indentation increased from about 2% of the sheet thickness at a welding current of 13,500 amp to about 10% at a welding current slightly above 14,000 amp.

It is apparent from the graphs in FIG. 1 that the detection of melting and subsequent movement of electrode (indentation) is potentially a good way of determining the state of the weld. Attempts which have been made in the past to use detection of electrode movement to control the welding process have, however, been unsuccessful. The reason for this is the difficulty of measuring in an accurate and repeatable way the small distances involved in the travel of spot-welding electrodes, which are of the order of 0.001 inch.

SUMMARY OF THE INVENTION

The invention accomplishes the detection of electrode travel indirectly by utilizing the fact that the mechanical stress (pressure) which is applied to the electrodes can be made to change when the weld is in the molten stage. A resulting strain in the electrodes is caused by the squeezing force and an opposite and equal reaction force exerted by the sheet metal, which balances the squeezing force. The electrodes are thus held immovable between the squeezing source and the sheet metal. An important feature of the invention is that the squeezing force is not held constant (as in other systems) but is allowed to change its magnitude as a function of the state of the metal in the spot welding area (solid or molten).

As soon as the metal goes into the molten stage, the electrodes will start moving towards each other, thus decreasing the strain in the electrodes. This change in strain magnitude is readily measured by use of electrical strain gages or other pressure transducers. Moreover, a typical change in electrode force is in the order of 0.3 KP (Kilo Pascal), which produces an excellent signal to noise ratio. The invention provides for the required change in strain magnitude by using squeezing force systems which follow the second order differential equation, $$m(d^2x/dt^2) = -Kx$$

A force system using spring-loaded electrodes is a good example of such a system. The force exerted by the spring is a function of the spring stiffness K and the statical deflection x of the spring. Any change in the statical deflection (produced by the onset of melting) will cause a change in the force and in the stress to which the electrode is subjected. A signal indicative of the resulting change in strain in the electrodes is then electronically processed and the processed signal is used to control or monitor the welding process so that possible defective welds can be detected and any required adjustments made in the welding process to eliminate defects in subsequent welds.

For a further understanding of the invention reference may be made to the following description of an exemplary embodiment, considered in conjunction with the accompanying drawings.

DESCRIPTION OF THE DRAWINGS

FIG. 1 (described above) is a set of diagrams showing the relationship between weld nugget diameter, weld breaking strength and electrode indentation for a range of welding currents; and FIGS. 2A and 2B together illustrate an embodiment of the invention schematically.

DESCRIPTION OF THE EMBODIMENT

Figure 2B:
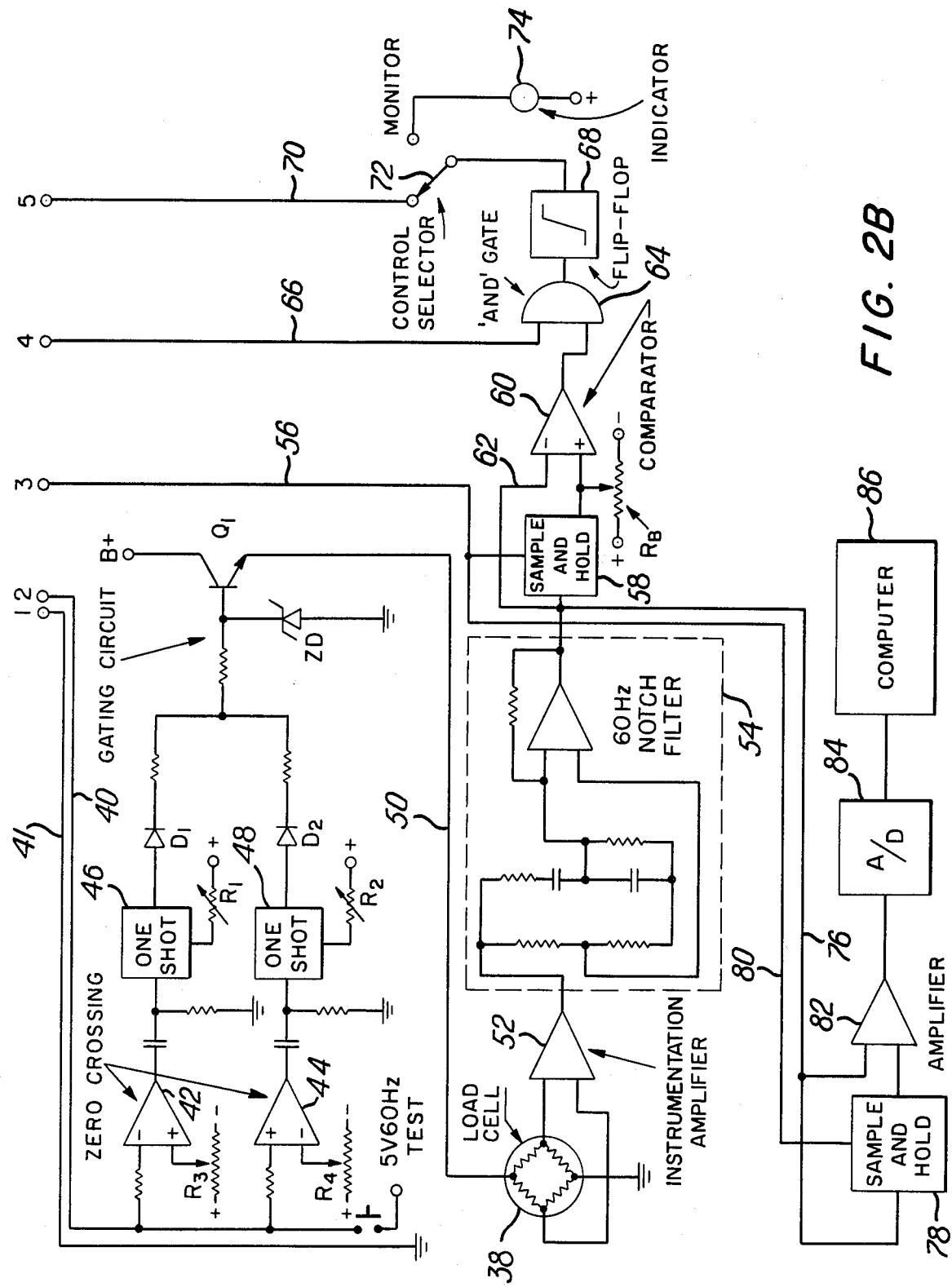

The welding machine (FIG. 2A) itself is conventional except in one important respect that is pointed out below. It comprises an electrode holder 10 having a fixed lower arm 12 and a movable upper arm 14. Welding current is supplied through the arms to the electrodes from the secondary winding 16 of a transformer 18, the primary windings 20 of which are energized with 60 herz alternating current through lines 22 and 24 when a timer controlled switch 26 is closed. A timer 28 controls all operations of the welding cycle, namely, the application of a squeezing force (hydraulic or mechanical) to move the movable arm toward the fixed arm, the closing of the switch 26 to cause welding current to be conducted between the electrodes E across the workpieces W, the opening of the switch 26 to shut off the welding current, and the release of the squeezing force after a hold time during which the weld solidifies.

In accordance with one aspect of the present invention the squeezing force $F_2$ actually applied to the workpieces originates as a force $F_1$ that is somewhat greater than the force $F_2$ and is supplied by a suitable mechanical or hydraulic device. The member 30 that delivers the force $F_1$ engages a fixed stop 32. The transmitting device for applying the squeezing force $F_2$ is, conveniently, a spring 34 that delivers a force that diminishes as it elongates. An electrical strain gage load cell 36 interposed between the member 30 and the spring 34 detects the force $F_2$ (load) in the spring and thus the squeezing force applied to the workpieces. This force, in turn, is indicative of the magnitude of the penetration of the electrodes into the workpieces that occurs when the weld becomes molten, inasmuch as the spring elongates and the force $F_2$ drops correspondingly when the movable electrode moves toward the fixed electrode in response to penetration of the workpieces.

The load cell 36 is of the type containing four strain gages connected in a bridge configuration (see FIG. 2B). Because of this configuration, sensitivity is increased and excellent temperature compensation is achieved. Since the strain gages are also subject to an extremely strong electromagnetic field during welding cycles, a circuit is provided which completely eliminates any interference by the welding current during welding cycles. A current sensor 38 (FIG. 2A) detects the alternating welding current in the secondary winding of the transformer 18 and is connected by lines 40 and 41 to two operational amplifiers 42 and 44 (such as National LM 741) that sense the point at which the welding current is at its minimum (zero crossing). This information is sent to two one-shot devices 46 and 48 (such as National LM 555) which can be set with the aid of potentiometers $R_1$, $R_2$, $R_3$ and $R_4$ for supplying base current to transistor $Q_1$ (such as Fairchild 2N3716) for any required duration during one sinusoidal cycle. Adjustment is possible between 5 and 100% of the sinusoidal cycle. Transistor $Q_1$ thus supplies excitation direct current from a source B+ to the load cell 36 through line 50 only for a duration during which interference by the magnetic field is minimal.

The strain signal from the load is amplified in an instrumentation amplifier 52, such as a National LF152, and passed through a 60 Hz filter 54. In response to a signal through line 56 from the timer given after the initial squeeze force is fully applied to the workpieces and just prior to or simultaneous with the closing of the switch 26 and the commencement of welding, the strain signal from the filter 54 is captured in a sample and hold device 58, e.g. National LF198. The captured output of the sample and hold device, which is the analog of the squeeze force before the actual welding takes place, is applied to one input of a comparator 60 (such as National LF111). This analog voltage is a reference voltage which does not change during the subsequent welding operation since its value is frozen by the sample and hold amplifier. The second output of the comparator receives through line 62 the amplified and filtered strain gage signal, which continues to be a function of further changes in electrode strain, and it is this signal that is compared to the reference signal during the following welding current cycles.

Through a bias arrangement RB the comparator 58 is forced to provide a negative output polarity whenever the variable strain signal is larger than the captured reference signal. At a certain point during the welding phase the metal begins to melt, thus reducing the electrode force $F_1$. This reduction in force causes the variable strain signal to decrease and fall below the reference signal in amplitude. The comparator 60 will now change to a positive output polarity. The logic output levels of the comparator are used as one input of an "AND" gate 64, such as a Fairchild 10104, the other input being a signal through line 66 from the main welding timer 28.

When the timer initiates the welding by closing the switch 26 to apply current to the workpieces, a positive signal voltage is sent to the "AND" gate, thus preparing the "AND" gate for changing its output voltage when the second necessary positive signal from the comparator 60 arrives. The welding current duration is governed by the timer (start) and the positive output of the "AND" gate (stop). The timer will also terminate the welding current if a predetermined excessive time has elapsed. In order to provide a clean stop signal to the timer, the "AND" gate signal triggers a Flip-Flop 68 (such as a Fairchild 54/7470), which latches upon receiving a positive pulse and stays in that state until re-set by the welding timer and which supplies the stop signal to the timer through the line 70.

The closed loop system, as described, is thus used to control the length of the welding cycle according to the state of phase of the workpieces rather than according to some arbitrary chosen parameters.

If it is desired, however, to monitor the welding operation rather than control it, a selector switch 72 disengages the feedback loop to the timer when put into the monitor mode. In the monitor mode the welding timer performs in a conventional way by controlling the welding cycle according to fixed pre-set timers. An indicator 74 will cause a sensory alarm if during the welding cycle the plastic (molten) phase has not been reached, thus indicating a poor weld or no weld at all.

In an alternate method of monitoring the welding cycle, based upon the concept of the invention—namely indentation information as a criterion for a good weld—the reference signal is supplied through line 76 to a sample and hold device 78 upon a timed command signal through line 80 from the timer 26 after the initial squeeze force $F_1$ is applied to the workpieces. The reference signal and the strain signal are fed into an amplifier 82. The resulting amplified output signal represents the strain during the welding cycle, starting from the moment that the welding current is applied to the workpiece. The entire waveform of the strain in the electrodes during the welding cycle is fed through an A/D convertor 84, such as Xycom 1855, into a microcomputer 86, such as Xycom 1868. The computer has been programmed to contain a previously recorded "master" waveform of a perfect weld. At the end of the welding cycle, the computer will perform the following:

a. Digitally filter the waveform in order to obtain a smooth record.
b. Compare the detected waveform during welding to the master waveform.
c. If the detected waveform is within a specified, programmed tolerance of the master waveform— provide an "OK" signal.
d. If the detected waveform does not meet specifications—reject the weld.

The waveform can also be analyzed for rate of change of the strain signal, which is an additional indication for the onset of the melting phase of the workpieces.

I claim:

1. In resistance spot-welding apparatus that includes a pair of electrodes positioned to receive workpieces between them, means for moving one electrode toward the other to apply a squeezing force to the workpieces, means for causing an electrical current to flow from one electrode to the other through the workpieces to form a weld, and means for controlling the duration of the flow of current through the workpieces, the improvement wherein the means for moving one electrode to apply a squeezing force to the workpieces includes a member that is movable under a force in a direction to apply the squeezing force, means for applying a force to the member substantially greater than a desired squeezing force, stop means engageable by the member for limiting the movement of the member in said direction, and a mechanical spring interposed between the member and the movable electrode for applying to the movable electrode a force that varies as a function of the indentation of the electrodes into the workpieces when the current melts them, and further comprising transducer means for detecting the force exerted by the mechanical spring and generating a welding signal indicative thereof, and signal processing means responsive to the transducer means for producing a signal indicative of a change in the squeezing force on the workpieces.

2. The improvement claimed in claim 1 wherein the signal processing means includes means for sampling and holding a reference signal indicative of the squeezing force applied to the workpieces before melting of the weld, and means for comparing the reference signal to signals generated by the transducer means as the weld is being formed and generating an output signal indicative of when and if a selected change in the squeezing force occurs during formation of the weld.

3. The improvement claimed in claim 2 and further comprising means for supplying the output signal to the current controlling means, and wherein the current controlling means terminates the application of current across the workpieces in response to the output signal.

4. The improvement claimed in claim 2 and further comprising means for monitoring the output signal and indicating whether or not the selected change in squeezing force occurs.

5. The improvement claimed in any of claims 1, 2, 3, and 4 wherein the means for causing current flow produces cycles of welding current and wherein the transducer means is an electrical strain gage load cell and further comprising means for supplying pulses of direct electrical current to the load cell in phase with selected and corresponding parts of the cycles of the welding current.

6. The improvement claimed in claim 5 wherein the means for supplying current to the load cell includes a current sensor circuit for detecting the welding current in the secondary winding, a pair of operational amplifiers driven by current in the sensor circuit for sensing the points at which the welding current is at its minimum and supplying output signals indicative thereof, a pair of one shot devices receiving the respective output signals of the amplifiers and supplying base currents to a transistor, and a source of direct electrical current, the transistor being connected in a conductor supplying the direct current to the load cell, whereby current is supplied to the load cell only when the welding current is near zero and interference by the magnetic field of the welding current is therefore minimal.

7. The improvement claimed in claim 1 wherein the signal processing means includes means for sampling and holding a reference signal indicative of an initial squeezing force applied to the workpieces, means for comparing the reference signal to signals generated by the transducer during the welding operation and producing a digital output waveform indicative of changes in the squeezing force and computing means for storing a master waveform of an ideal digital signal indicative of the changes in squeezing force occuring during an optimum welding operation, for receiving the digital output waveform of the monitored welding operation and for comparing the master waveform with the digital output waveform.

8. In a resistance spot welding method in which workpieces are squeezed between a pair of electrodes and an electrical current is conducted between the electrodes through the workpieces to form a weld, the improvement comprising the steps of applying to a movable member a force substantially greater than a desired squeezing force, stopping the movement of said member at a predetermined location while maintaining said force, transmitting a force from said member to a movable electrode through a mechanical spring to provide a squeezing force through the electrodes on the workpieces that varies as a function of the indentation of workpieces by the electrodes when the current melts them, detecting the squeezing force during welding and generating a welding signal indicative thereof, and processing the welding signal to produce a signal indicative of a change in the squeezing force applied to the workpieces.

9. The improvement claimed in claim 8 wherein the welding signal processing step includes the steps of sampling and holding a reference signal indicative of the squeezing force applied to the workpieces before melting of the weld, and comparing the reference signal to the welding signal and generating an output signal indicative of when and if a selected change in the squeezing forces occurs during formation of the weld.

10. The improvement claimed in claim 9 and further comprising the step of terminating the supply of current across the workpieces in response to an output signal indicative of a selected change in the squeezing force that is, in turn, indicative of indentation of the electrodes into the workpieces at the onset of melting of the weld.

11. The improvement claimed in claim 9 and further comprising the step of monitoring the output signal and producing a sensory indication of whether or not a change in the squeezing force indicative of the onset of melting of the weld occurs.

12. The improvement claimed in any of claims 8, 9, 10 and 11 wherein current is conducted through the electrodes cylically and wherein the signal indicative of the squeezing forces is an electrical signal from an electrical strain gauge load cell and further comprising the step of supplying pulses of direct electrical current to the load cell in phase with selected and corresponding parts near zero of the cycles of the welding current.

13. The improvement claimed in claim 8 wherein the signal processing step includes the steps of sampling and holding a reference signal indicative of an initial squeezing force applied to the workpieces, comparing the reference signal to the welding signal, producing a digital output waveform of the squeezing force during welding and comparing the output waveform to a master waveform of an ideal welding operation.

* * * * *

UNITED STATES PATENT AND TRADEMARK OFFICE
CERTIFICATE OF CORRECTION

PATENT NO. : 4,419,558

DATED : December 6, 1983

INVENTOR(S) : Ariel Stiebel

It is certified that error appears in the above-identified patent and that said Letters Patent is hereby corrected as shown below: On the title page Item [73]: Assignee: "Wagen of America, Inc." should be --Volkswagen of America, Inc.--

*Signed and Sealed this*

*Twenty-seventh* Day of *March 1984*

[SEAL]

*Attest:*

GERALD J. MOSSINGHOFF

*Attesting Officer*     *Commissioner of Patents and Trademarks*